United States Patent
Ooiwa

(10) Patent No.: US 6,633,096 B2
(45) Date of Patent: Oct. 14, 2003

(54) ALTERNATOR

(75) Inventor: Tooru Ooiwa, Toyota (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/972,928

(22) Filed: Oct. 10, 2001

(65) Prior Publication Data

US 2002/0047332 A1 Apr. 25, 2002

(30) Foreign Application Priority Data

Oct. 11, 2000 (JP) ........................................ 2000-310940

(51) Int. Cl.⁷ ................................................ H02K 1/00
(52) U.S. Cl. ........................ 310/45; 310/256; 310/263
(58) Field of Search .......................... 310/256, 45, 44, 310/216, 254, 261, 263, 228, 86, 272, 273

(56) References Cited

U.S. PATENT DOCUMENTS

| | | | | | |
|---|---|---|---|---|---|
| 3,163,788 A | * | 12/1964 | Powers | ........................ | 310/45 |
| 3,539,853 A | * | 11/1970 | Photiadis | ..................... | 310/216 |
| 3,646,374 A | * | 2/1972 | Jordan et al. | .................. | 310/45 |
| 4,214,921 A | * | 7/1980 | Henderson | .................. | 148/246 |
| 4,293,785 A | * | 10/1981 | Jackson, Jr. | .................. | 310/64 |
| 4,777,396 A | * | 10/1988 | Ito et al. | ...................... | 310/271 |
| 5,473,211 A | * | 12/1995 | Arkkio | ........................ | 310/166 |
| 5,625,243 A | * | 4/1997 | Lindgren et al. | ........... | 310/211 |
| 5,757,102 A | * | 5/1998 | Adachi et al. | .............. | 310/263 |
| 5,828,155 A | * | 10/1998 | Adachi et al. | .............. | 310/263 |
| 5,836,270 A | * | 11/1998 | Aoki et al. | ............... | 123/41.31 |
| 6,242,831 B1 | * | 6/2001 | Khan | .......................... | 310/90 |

FOREIGN PATENT DOCUMENTS

| | | | | | |
|---|---|---|---|---|---|
| EP | 260743 | * | 3/1988 | ........... | F16C/33/10 |
| FR | 2543676 | * | 10/1984 | ........... | G01F/23/38 |
| JP | 64-87921 | * | 4/1989 | ........... | F16C/33/82 |
| JP | A 10-4641 | | 1/1998 | ........... | H02K/1/18 |

* cited by examiner

*Primary Examiner*—Burton Mullins
(74) *Attorney, Agent, or Firm*—Oliff & Berridge, PLC

(57) ABSTRACT

A brushless generator is composed of a front bracket, a rear bracket, a stator, a rotary shaft, a core, poles, a ring, a field core, a field winding bobbin, and a field winding. Air gaps are defined by facing surfaces between the field core and the core, between the poles and the stator, between one side of a pole and the field core, and between the core and another side pole. Magnetic coating made of magnetic particles and a binding material is applied to the surfaces which face the air gaps. A tensile strength of the magnetic coating is set smaller than a bonding strength of the same. Thus, in case that the surfaces to which the magnetic coating is applied is damaged by an external force, the magnetic coating does not peel but rather the breaking of the base material occurs.

18 Claims, 2 Drawing Sheets

ALTERNATOR

CROSS REFERENCE TO RELATED APPLICATION

The present application relates to and incorporates herein by reference, Japanese Patent Application No. 2000-310940 filed on Oct. 11, 2000.

BACKGROUND OF THE INVENTION

1. Field of the Invention

The present invention relates to a rotary electric machine mounted within a passenger car, truck or other vehicle.

2. Description of Related Art

In recent years, vehicle engine compartment volumes have decreased due to an increasing popularity of aerodynamic, sloped hoods and by the desire to increase passenger compartment space by utilizing space previously occupied by engine compartments. This has resulted in less space to mount engine components, and in particular, a vehicle engine alternator. Also, because of a desire to increase fuel economy of engines, engine rotation-per-minute (rpm) values have decreased in an effort to reduce engine cylinder firings while maintaining vehicle speed. Because of a decrease in engine rpms, alternator rpms have generally decreased. However, due to increased demand for devices such as safety control apparatuses that utilize electrical current, an increase in electrical current to energize the devices is desired. Therefore, it is desired to provide a small-sized, high power vehicle alternator to increase power generation capacity, yet provide the alternator at a low price.

Moreover, it is desired to decrease engine noise in response to consumer demand to decrease overall vehicular noise, including the noise level detectable in the passenger compartment. Therefore, the noise caused by fan blades or magnetic noise of the alternator which increases in direct proportion to engine speed, is desired to be reduced.

In a conventional vehicle alternator, a stator is constructed by winding a continuous wire around a stator core. A vehicle's alternator structure must be improved in order to meet current requests which include small alternator size, high power generation, and reduced sound output levels.

Generally, in various rotary electric machines such as a vehicle alternator and the like, magnetic resistance exists because of an air gap between a rotor and a stator. Decreasing magnetic resistance on a magnetic excitation circuit will improve alternator performance. Therefore, in order to improve performance, it is desired to decrease the magnetic resistance by decreasing the size of the air gap and by increasing a facing area between the stator and the rotor. However, expansion of the facing area is limited due to a space restriction. Therefore, it is impossible to unlimitedly enlarge the facing area. Moreover, in consideration of a mechanical limitation such as component precision, assembling precision, and deformation of the rotor during rotation, a certain amount of air gap is necessary.

In the vehicle alternator, it is known that magnetic noise is decreased by suppressing excessive magnetic pulsations between the rotor and the stator core. This is normally accomplished by increasing the air gap between the rotor and the stator core. Thus, it is desired to increase the air gap in order to suppress the magnetic noise.

Further, in an air cooled type vehicle alternator, brine, slurry and other vehicle liquids may adhere to the facing surfaces of the rotor and the stator. In this case, the rotor is likely to lock due to corrosion generated on the rotor core and the stator core. Thus, it is undesirable to decrease the air gap by an extreme amount.

Therefore, in the conventional rotary electric machine, it is necessary to secure a predetermined air gap due to mechanical limitations, sound suppression, and to prevent the rotor from becoming locked by corrosion. Although it is desired to decrease the air gap on the magnetic circuit, it is impossible to decrease the air gap an extreme amount.

SUMMARY OF THE INVENTION

In view of the foregoing problems, it is an object of the present invention to provide a rotary electric machine in which an air gap is substantially decreased.

In the rotary electric machine according to the present invention, a rotor includes a rotor core alternately generating north and south (N/S) poles in a circumferential direction, and a field winding which is wound around the rotor core. Also, a stator includes a stator core arranged opposite to the rotor core and a stator coil wound around the stator core. The rotor and the stator are supported by a frame. A magnetic coating made of magnetic particles and a binding material, which binds the magnetic particles, is formed on at least one of the facing surfaces of the rotor core and the stator core which are opposite to each other. A tensile strength of the magnetic coating is designed to be lower than a bonding strength between the surface where the magnetic coating is formed and the magnetic coating. That is, if the magnetic coating is damaged by an external contact force, the magnetic coating will not break in the form of peeling from a surface of the core, but will break within the base material.

In this way, the magnetic coating is formed on one of the facing surfaces of the rotor core and the stator core, which are opposite to each other and define an air gap therebetween. That is, a magnetic substance exists in the air gap. Therefore, the air gap is equivalently decreased on the magnetic circuit. On the other hand, since the magnetic substance dispersedly exists in the magnetic member, the magnetic resistance on the magnetic circuit is not equal to that of the core. Therefore, there is no portion where a magnetic flux density is as high as that of the core. Accordingly, as compared with a case where the air gap between the opposing cores is small, there is no excessive magnetic pulsation so that the magnetic noise can be suppressed.

The above mentioned rotor has a pair of rotor cores including claw portions generating N/S poles and a boss portion comprising the field winding. The pair of cores are arranged oppositely to each other at an end surface of the boss portion to form a Lundell-type core. The magnetic coating is applied to at least one of the outer peripheral surfaces of the claw portions, the end surface of the boss portion, and an inner peripheral surface of the stator core. In the rotary electric machine having the Lundell-type core, the claw portions are deformed by receiving centrifugal force during rotation. Therefore, it is necessary to secure the air gap more than in other rotary electric machines. However, in the rotary electric machine of the present invention, the magnetic coating is formed on the surface of the cores which face the air gap. Therefore, in case the magnetic coating makes contact with each other or contact with the core in accordance with the rotation deformation of the rotor core, only a part of the magnetic coating is peeled and separates. Accordingly, the actual air gap can be set smaller.

Further, the rotor is composed of a first claw portion, a second claw portion, a boss portion and a field winding holding portion. The first claw portion is in a substantially cylindrical shape and produces N/S poles. The second claw portion holds the first claw portion through a non-magnetic member and is connected to a rotary shaft. The boss portion is arranged on an inner peripheral side of the field winding and is connected to the rotary shaft. The rotor winding holding portion holds the field winding and forms a magnetic circuit connecting the first claw portion and the boss portion. The magnetic coating is applied to at least one of the outer peripheral surfaces of the first and the second claw portions, an inner peripheral surface of the first claw portion, outer and inner peripheral surfaces of the rotor winding holding portion, and an inner peripheral surface of the stator core.

In this rotor used as a brushless generator, the claw portions are easily deformed due to centrifugal force during rotation. Therefore, it is necessary to set the air gap larger than that of a rotary electric machine having brushes. However, similar to the rotary electric machine having the Lundell-type core, the magnetic coating is formed on the surface of the core defining the air gap. Therefore, in case the magnetic member contacts other magnetic members or the core in accordance with the rotation deformation of the rotor core, only part of the magnetic coating peels and physically separates. Thus, the actual air gap can be set small.

The binding material is designed to be lubricious. Since the magnetic coating is made of a lubricated material such as grease and fills the air gap, the air gap can be substantially decreased to zero. That is, the air gap is at least minimized. Further, in the case where the rotor contacts the opposite stator core, because the magnetic coating is lubricious the possibility of problems such as noise or baking is likely to be decreased. Therefore, the distance between the rotor core and the opposing stator core is shortened.

Further, it is desired that the binding material also be an insulating material. It is known that unnecessary excess current occurs on the core surface where the magnetic flux changes, thereby deteriorating the efficiency of power generation. However, in the present invention, the magnetic coating made of the insulating material is formed on the surface of the cores so that occurrences of the excess current decrease and the output power can be increased.

Further, the above-described binding member is designed to also be a rust inhibitor. Since the rust inhibitor is placed on the surface of the cores, in the case that brine, slurry, and the like adhere on the core surfaces, rusting is inhibited. Accordingly, a locked rotor is prevented from occurring due to the prevention of corrosion from forming.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF PREFERRED EMBODIMENTS

A preferred embodiment of the present invention will be described hereinafter with reference to the accompanying drawings.

Figure 1:
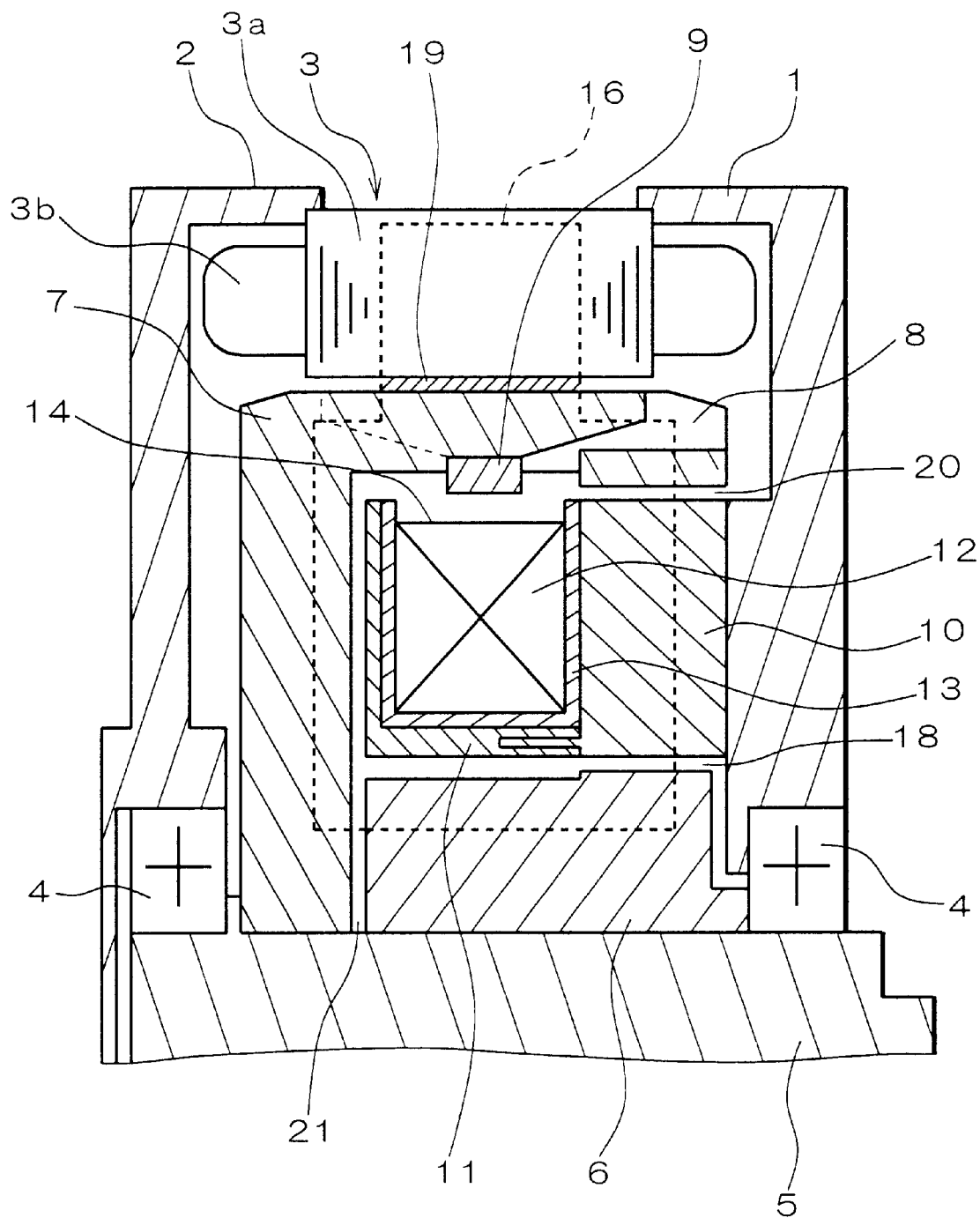
FIG. 1 shows a partial structure of a claw-pole type brushless generator according to an embodiment of the present invention.

FIG. 1 shows a partial structure of a claw-pole type brushless generator according to a present embodiment. A rotor and a stator are mainly illustrated. The brushless generator is composed of a front bracket 1, a rear bracket 2, a stator 3 and a rotation shaft 5, a core 6, poles 7 and 8, a ring 9, a field core 10, a field winding bobbin 11 and a field winding 12.

The rotor is composed of the rotation shaft 5, the core 6, the poles 7 and 8, the ring 9, the field core 10, the field winding bobbin 11, and the field winding 12. A rotor core includes the core 6, the poles 7 and 8 and the field core 10. The core 6, the poles 7 and 8, and the field core 10 correspond to a boss portion, claw pieces, and a rotor winding holding portion, respectively.

The rotation shaft 5 is rotatably supported by bearings 4 which are provided on the front bracket 1 and the rear bracket 2. The core 6 is provided on an outer periphery of the rotation shaft 5 and is in a cylindrical shape. The core 6 integrally rotates with the rotation shaft 5. Each of the poles 7 has a claw-pole piece on its outer periphery and the claw-pole piece is opposed to an inner peripheral surface of the stator 3 by a predetermined gap. An inner peripheral side of the pole 7 is fixed to the rotation shaft 5 to integrally rotate with the rotation shaft 5. Each of the poles 8 has a claw-pole piece. The claw-pole pieces of the poles 7 and 8 are located on an identical circumference. The poles 7 and 8 are connected to the ring 9 made of non-magnetic material in such a manner that the claw-pole pieces of the poles 7 and 8 are alternately arranged in a peripheral direction. The field core 10 is in a cylindrical shape and is provided on an outer periphery of the core 6. The field winding 12 is wound around a part of the field core 10. The field core 10 is fixed to the front bracket 1.

The field winding 12 is a rotor coil for generating a magnetic field. The field winding 12 is wound around the field winding bobbin 11 through an insulating coat 13, and mounted on the field core 10. Insulating tape 14 is wound around an outer periphery of the field winding 12.

The stator 3 consists of a stator core 3a and a stator coil 3b. The stator 3 and the rotor are housed in the front bracket 1 and the rear bracket 2.

In the above brushless generator, the rotation shaft 5 is rotated in a predetermined direction when rotation force is transmitted to a pulley (not shown) through a belt or the like. The core 6 and the poles 7 and 8 are integrally rotated by the rotation of the rotation shaft 5. In this state, when the field winding 12 is energized, each of the poles 7 and 8 produces a S-pole or N-pole. Thus, rotary magnetic poles are formed so that three-phase alternating current and voltage is generated in the stator 3.

When the field winding 12 is energized, a main magnetic flux 16 is generated in a regular direction in accordance with polarity. The main magnetic flux 16 flows from the field core 10 to the core 6 through an air gap 18 defined therebetween. Next, the flux 16 flows from the core 6 to the adjacent pole 7 through an air gap 21 defined between the core 6 and the pole 7. Then, the flux 16 flows from the claw-pole pieces of the pole 7 to the stator 3 through an air gap 19 defined therebetween. Further, the flux flows from the stator 3 to the claw-pole piece of the pole 8 through the air gap 19 defined therebetween. Finally, the flux 16 returns to the field core 10 from the pole 8 through an air gap 20 defined between the claw pole pieces of the pole 8 and the field core 10.

In the present embodiment, the magnetic coating is applied on the surfaces of each member defining the above air gaps 18, 19, 20 and 21. The tensile strength of the magnetic coating on a particle is designed to be lower than that of the bonding strength of the coating on a surface of a coated member, such as the stator and/or rotor. Therefore, in the event that part of the magnetic coating on a particle is damaged by an external force, such as a contact force, the mode of breakage is not likely to be a boundary peeling on the surface of the member where the magnetic coating is applied, but breaking of the coating material on the particle results.

More specifically, the magnetic coating made of grease and including magnetic particles, is applied on each of the opposing faces of the field core 10 and the core 6 which define the air gap 18 and are opposed to each other. An insulating magnetic coating is applied to each of surfaces of the poles 7 and 8 which face the air gap 19. The insulating magnetic coating is made by bonding magnetic particles which is pre-coated by an epoxy resin material with another epoxy resin material. Further, a magnetic coating such as the one discussed above, but having a rust inhibitor, is applied to an inner peripheral surface of the stator 3. Also, the rust inhibiting magnetic coating is applied on each of the facing surfaces of the pole 8 and the field core 10 which are opposite each other and define the air gap 20. Further, the magnetic coating made of the grease and the magnetic particles is applied to each of the facing surfaces of the core 6 and the pole 7 which oppose each other define the air gap 21.

The air gaps 18 and 21 are substantially closed spaces. The magnetic coating, being lubricious, and made of the grease and magnetic particles, is applied so as to fill the open spaces. Thus, air gaps 18 and 21 can be essentially closed when filled with the lubricious magnetic coating. However, since it is impossible to form a completely closed space, the grease included in the magnetic coating is desired to have excellent viscosity which does not deteriorate even at a high temperature, and have anti-corrosive properties against the core 6 and the like.

Since the insulating magnetic coating is applied to the surfaces of the poles 7 and 8 which are adjacent to the space 19, excess current which occurs on the surfaces of the poles 7 and 8 at a time of generating power is decreased. This prevents output power from being reduced due to excess current loss.

Further, the rust-proof, magnetic coating is applied on the inner surface of the stator 3 which is adjacent to the space 19, and the surfaces of the pole 8 and the field core 10 which are opposite to each other and define the air gap 20. Thus, even in an air-cooled type alternator, the surfaces where the rust-proof magnetic coating is applied are not easily corroded, even if brine, slurry, and other vehicle liquid formulations adhere to them. Accordingly, the rotor is prevented from locking due to corrosion.

In the present embodiment, the corrosion inhibiting, magnetic coating is applied to all members which are adjacent to the spaces 18, 19, 20, and 21 on the main magnetic flux route 16. However, for example, the magnetic coating may be applied only to the member which is adjacent to some of the spaces. Further, the magnetic coating may be applied to surfaces of each member in other ways, such as spraying a magnetic coating layer rather than direct application (brushing, for instance).

Further, the present invention may be applied to other rotary electric machines in addition to the brushless generator.

Figure 2:
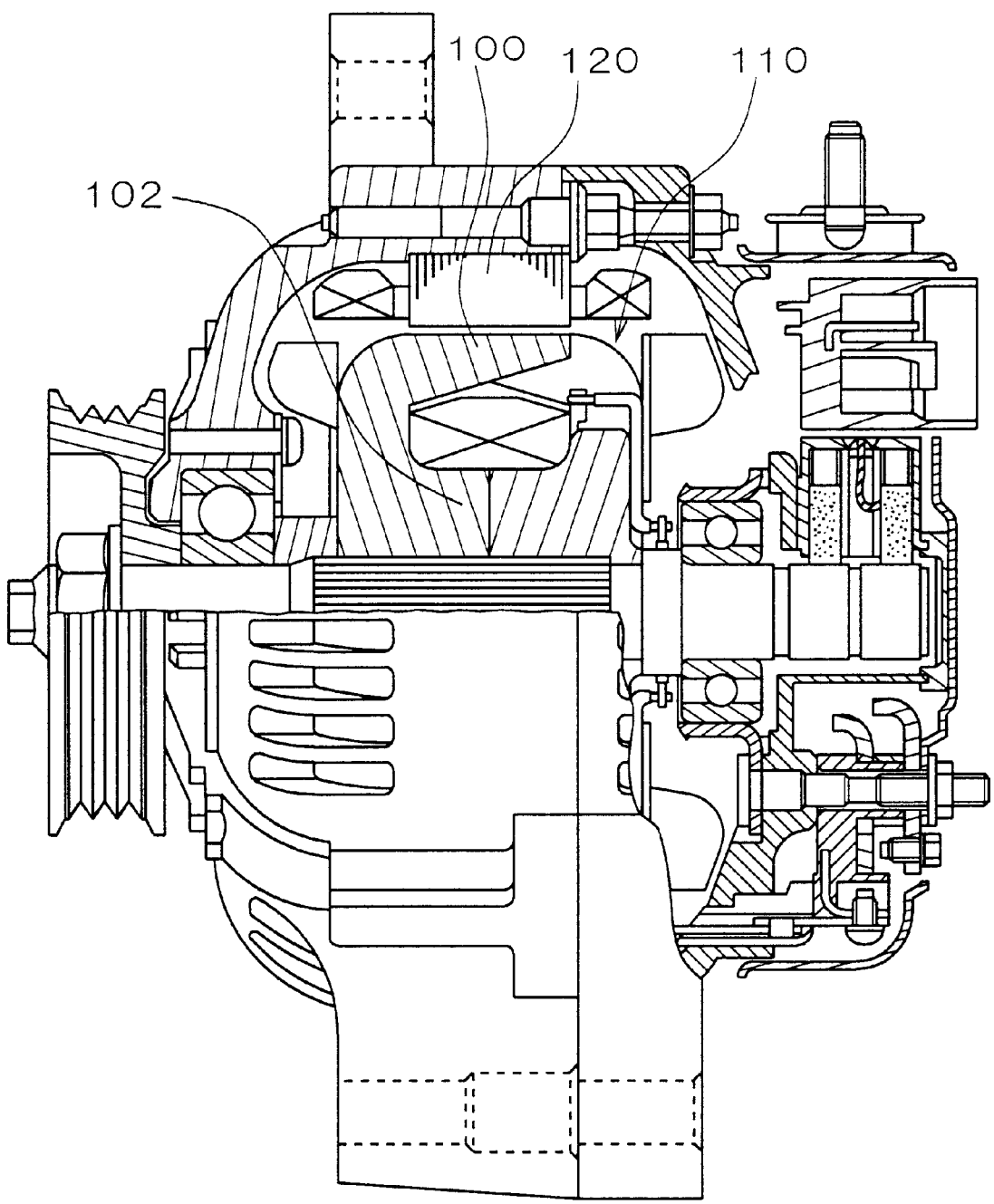
FIG. 2 is a cross-sectional view of a generator for a vehicle having a rotor including a Lundell core.

FIG. 2 is a cross-sectional view of an alternator for a vehicle which has a rotor including a Lundell-type core. The rotor 110 has a pair of rotor cores each of which includes claw pieces 100 producing N/S poles and a boss portion 102 having the rotor windings therearound. In this structure, two air gaps are formed on a main magnetic flux route generated by the field winding. One air gap is defined between the claw pieces 100 and an inner peripheral surface of the stator 120, and the other air gap is defined between opposing surfaces of the pair of boss portions 102. Therefore, the magnetic coating may be applied to the members which face the above air gaps.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A rotary electric machine, comprising:

a rotor including a rotor core that alternately generates north and south poles in a circumferential direction and a field winding wound around the rotor core;

a stator including a stator core arranged opposite to the rotor core and a stator coil wound around the stator core; and a frame supporting the rotor and the stator, wherein a magnetic coating made of magnetic particles and binding material binding the magnetic particles is formed on at least one of opposite surfaces of the stator and the rotor and a tensile strength of the magnetic coating is set smaller than a bonding strength between the magnetic coating and a surface where the magnetic coating is formed.

2. The rotary electric machine of claim 1, wherein the rotor includes a pair of rotor cores, each of which includes claw portions generating north and south poles and a boss portion having a rotor winding therearound;

wherein the pair of rotor cores forms a Lundell-type core and is arranged opposite to each other at an end surface of the boss portion; and wherein the magnetic coating is applied to at least one outer peripheral surface of the claw portions, the end surface of the boss portion and an inner peripheral surface of the stator core.

3. The rotary electric machine according to claim 2, wherein the binding material has lubricity.

4. The rotary electric machine according to claim 2, wherein the binding material is an insulating material.

5. The rotary electric machine according to claim 2, wherein the binding material contains a rust inhibitor.

6. The rotary electric machine according to claim 1, wherein the rotor includes:

a first claw portion having a cylindrical shape and generating north and south poles;

a second claw portion holding the first claw portion through a non-magnetic member and connected to the rotary shaft;

a boss portion arranged at an inner peripheral side of the field winding and connected to the rotary shaft; and a field winding holding portion holding the field winding and forming a magnetic circuit which connects the first claw portion and the boss portion, and wherein the magnetic coating is applied to at least one outer peripheral surface of the first and the second claw portions, an inner peripheral surface of the first claw portion, an inner and an outer peripheral surface of the field winding holding portion and an inner peripheral surface of the stator core.

7. The rotary electric machine according to claim 6, wherein the binding material has lubricity.

8. The rotary electric machine according to claim 6, wherein the binding material is an insulating material.

9. The rotary electric machine according to claim 6, wherein the binding material contains a rust inhibitor.

10. The rotary electric machine according to claim 1, wherein the binding material has lubricity.

11. The rotary electric machine according to claim 1, wherein the binding material is an insulating material.

12. The rotary electric machine according to claim 1, wherein the binding material contains a rust inhibitor.

13. An alternator for a vehicle, the alternator comprising:
   a frame supporting a rotor and a stator;
   wherein the frame has a front bracket and a rear bracket, the front and rear brackets securing the stator and the rotor therebetween;
   wherein the rotor includes a rotation shaft, a core, a first pole, a second pole, a ring, a field core, a field winding bobbin, and a field winding;
   wherein the stator includes a stator core, and a stator coil;
   wherein the field core and the core define a first air gap, the core and the first pole define a second air gap, the first pole and the stator define a third air gap, the stator and the second pole further define the third air gap, and the second pole and the field core define a fourth air gap; and
   wherein a magnetic coating is applied on at least one of the field core or the core, which define the first air gap.

14. The alternator of claim 13, wherein the magnetic coating is made of magnetic particles and a binding material to bind the magnetic particles.

15. The alternator of claim 14, wherein a tensile strength of the magnetic coating is lower than a bonding strength between the magnetic coating and a surface to which the magnetic coating is applied.

16. The alternator of claim 15, wherein the binding material is lubricious, to facilitate any potential contact between opposing surfaces of the air gaps when the air gaps are minimized.

17. The alternator of claim 16, wherein the binding material is an insulating material and a rust inhibitor.

18. An alternator for generating electricity for a motor vehicle, the alternator comprising:
   a rotor including a rotor core that alternately generates north and south poles in a circumferential direction and a field winding wound around the rotor core;
   a stator including a stator core arranged opposite to the rotor core and a stator coil wound around the stator core; and
   a frame supporting the rotor and the stator,
   wherein a magnetic coating made of magnetic particles and a binding material binding the magnetic particles is formed on at least one of opposite surfaces of the stator and the rotor;
   wherein a tensile strength of the magnetic coating is designed to be lower than a bonding strength between the magnetic coating and a surface where the magnetic coating is applied;
   a first claw portion having a cylindrical shape and generating north and south poles;
   a second claw portion holding the first claw portion through a non-magnetic member and connected to the rotary shaft;
   a boss portion arranged at an inner peripheral side of the field winding and connected to the rotary shaft; and
   a field winding holding portion holding the field winding and forming a magnetic circuit which connects the first claw portion and the boss portion, and
   wherein the magnetic coating is applied to at least one outer peripheral surface of the first and the second claw portions, an inner peripheral surface of the first claw portion, an inner and an outer peripheral surface of the field winding holding portion and an inner peripheral surface of the stator core;
   wherein the binding material is lubricious;
   wherein the binding material is an insulating material; and
   wherein the binding material is a rust inhibitor.

* * * * *